E. B. DE LOE.
CRANK HOLDER.
APPLICATION FILED NOV. 22, 1915.

1,199,969.

Patented Oct. 3, 1916.

Witnesses

E. B. De Loe   Inventor,
by C. A. Snow & Co.
Attorneys.

UNITED STATES PATENT OFFICE.

EDGAR BURDETTE DE LOE, OF COFFEYVILLE, KANSAS.

CRANK-HOLDER.

1,199,969.  Specification of Letters Patent.  Patented Oct. 3, 1916.

Application filed November 22, 1915. Serial No. 62,898.

*To all whom it may concern:*

Be it known that I, EDGAR B. DE LOE, a citizen of the United States, residing at Coffeyville, in the county of Montgomery and State of Kansas, have invented a new and useful Crank-Holder, of which the following is a specification.

The present invention is an attachment for Ford and other automobiles, and is adapted to hold the starting crank in an upright position, whereby the crank will be prevented from rattling. It is also desirable to hold the crank in upright position, since it is frequently the case with a crank hanging in a depending position, that the same becomes bent or broken by striking a stone, stump or other obstruction over which the vehicle passes, and further a depending handle soon becomes besmeared with mud when driving on muddy roads, and it is both inconvenient and undesirable to have the starting crank spattered with mud.

It is the object of the invention to provide an attachment of the nature indicated which is extremely simple and inexpensive in construction and manufacture, the same being readily applicable to various automobiles, and being readily altered for application to various makes of cars if necessary.

The present device although simple is thoroughly practical, convenient and efficient in use.

With the foregoing and other objects in view which will appear as the description proceeds, the invention resides in the combination and arrangements of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1:
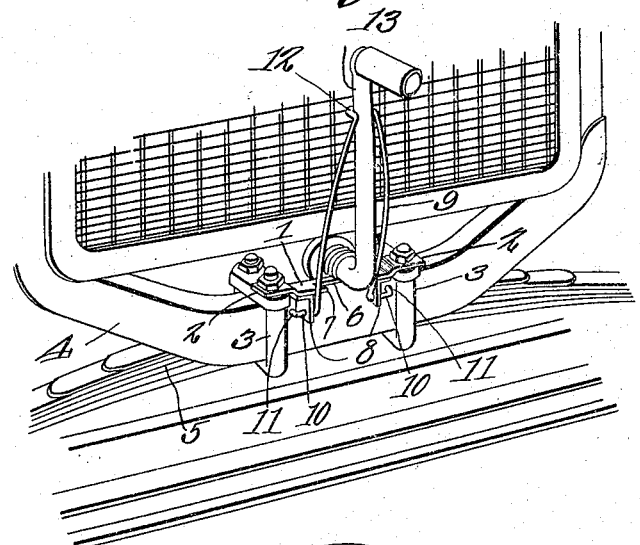
Figure 2:
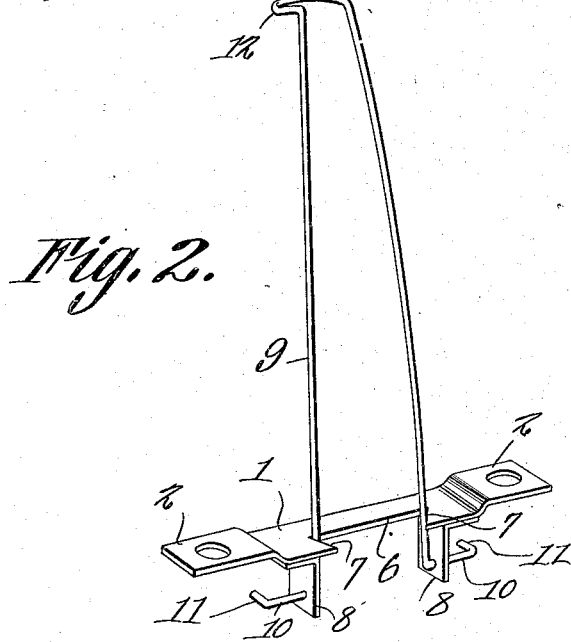

Figure 1 is a fragmental perspective view illustrating a starting crank and adjacent parts of a motor vehicle, with the attachment applied and in position to hold the crank upright. Fig. 2 is an enlarged perspective view of the attachment by itself, with the crank holding member in released position.

In carrying out the invention, the body of the attachment simply embodies a transverse horizontal strip 1 having its end portions 2 offset upward and apertured to engage the bolts 3 which are used for clamping the forward end of the frame 4 upon the front spring 5. Fig. 1 depicts a Ford automobile, although it is to be understood that the attachment can be applied to various automobiles, appropriate changes in the formation of the strip 1 being made so that said strip can be properly attached to the frame or other supporting member of the machine. The forward edge of the strip 1 is provided with a recess 6 intermediate the ends of the strip, and the ends of said recess are undercut or arranged obliquely, as at 7. The strip 1 has depending apertured ears 8 adjacent the ends of or at the opposite sides of the recess 6.

The crank engaging member 9 is in the form of a doubled wire or rod, constructed of resilient or springy material, the bend of the member or spring 9 being uppermost, and the terminals of said member being outturned, as at 10, and being journaled through the apertures of the ears 8, whereby to pivot or hinge the member 9 to the strip 1. The terminals 10 have angular portions 11 for preventing the terminals from being withdrawn from the ears 8, but allowing the limbs of the member 9 to be moved together sufficiently to pass into and out of the recess 6. The limbs of the member 9 tend to separate, and the bend or free portion of the member 9 is provided with an angularly extending curved portion or seat 12 for receiving the starting crank 13, as will be clearly evident by reference to Fig. 1.

Before the engine is cranked, the member 9 is released from the crank 13, this being accomplished by pressing the limbs of the member 9 toward one another so that they can be swung into the recess 6, and then when the member 9 is released, its limbs will spring apart to bear against the ends of the recess 6. Since said ends are undercut or oblique, the member 9 will be held in place, said member being moved rearwardly away from the crank 13, so that said crank can be readily rotated by hand for starting the engine as usual. After the engine is started, the limbs of the member 9 are swung forward out of the recess 6, and they will separate and move beyond the ends of the recess 6 so as to bear against the forward edge of the strip 1. The crank is then brought to upright position and will press the limbs of the member 9 back, and portion 12 will automatically engage or straddle the crank 13 without the hand touching the member 9. The limbs of the member 9 will be bowed or sprung forwardly by the strip 1 between the terminals 10 and portion 12 of said member, whereby there is a tendency to spring the free portion of said member forwardly. This holds said member securely engaged with the crank 13, and prevents said crank from rattling. Furthermore, the crank is held in an upright position so that there is no likelihood of its being bent or broken by stones or other obstructions over which the machine passes, and the crank will also be held sufficiently above the ground that it will not become spattered with mud or dirt. When the member 9 bears against the edge of the strip 1, as seen in Fig. 1, said member 9 can not swing away from the crank, or the plane of rotation of the crank, whereby the member 9 is effectively held in engagement with the crank under spring tension.

Having thus described the invention, what is claimed as new is:—

1. In a device of the character described, a supporting member, and a resilient holding member pivoted thereto and having means at its free portion for engaging a crank, the holding member bearing against a portion of the supporting member above the pivot point when the holding member is in position to engage a crank so that the holding member can not swing away from the crank, and the holding member being movable away from said portion of the supporting member so that the holding member can be released from the crank.

2. In a device of the character described, a supporting member having a recess, and a resilient holding member pivoted to the supporting member and having crank engaging means at its free portion, said holding member bearing against the supporting member when in crank engaging position to prevent said holding member swinging away from the crank, and the holding member being movable into said recess to hold the holding member in released position.

3. In a device of the character described, a supporting member having a recess, and a doubled resilient holding member having its terminals pivotally connected to said supporting member and having crank engaging means at its bend, the limbs of the holding member having a tendency to separate to bear against the supporting member beyond the ends of the recess to prevent the holding member from swinging away from the crank, the limbs of the holding member being adapted to be pressed together to swing into said recess to hold said holding member in released position.

4. In a device of the character described, a strip having a recess with undercut ends and having depending ears adjacent the ends of said recess, and a doubled resilient member having outturned terminals journaled through said ears and having an angular portion at its bend for engaging a crank, the limbs of said member being adapted to bear against one edge of the strip so as to prevent said member from swinging away from the crank and adapted to be moved toward one another to pass into said recess.

In testimony that I claim the foregoing as my own, I have hereto affixed my signature in the presence of two witnesses.

EDGAR BURDETTE DE LOE.

Witnesses:
DALLAS W. KNAPP,
J. F. KLOWITTER.

Copies of this patent may be obtained for five cents each, by addressing the "Commissioner of Patents, Washington, D. C."